(12) United States Patent
Berwanger

(10) Patent No.: US 9,574,626 B1
(45) Date of Patent: Feb. 21, 2017

(54) RIGID BRACKET ASSEMBLY FOR MOUNTING A BRAKE ASSEMBLY AND BRAKE ACTUATOR

(71) Applicant: Bendix Spicer Foundation Brake LLC, Elyria, OH (US)

(72) Inventor: Fred W. Berwanger, Edwardsburg, MI (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 46 days.

(21) Appl. No.: 14/810,600

(22) Filed: Jul. 28, 2015

(51) Int. Cl.
  F16D 65/00 (2006.01)
  F16D 51/28 (2006.01)
  F16D 51/00 (2006.01)

(52) U.S. Cl.
  CPC ........... *F16D 65/0056* (2013.01); *F16D 51/28* (2013.01); *F16D 2051/003* (2013.01)

(58) Field of Classification Search
  CPC ...... F16D 51/24; F16D 2125/30; F16D 65/22; F16D 2125/56; F16D 2051/003; F16D 65/09; F16D 2055/0008; B60T 17/088; F16L 43/06
  USPC .......................................................... 188/325
  See application file for complete search history.

(56) References Cited

U.S. PATENT DOCUMENTS

| | | | | |
|---|---|---|---|---|
| 2,755,890 A | * | 7/1956 | Scheel | F16D 51/20 188/106 R |
| 3,076,531 A | * | 2/1963 | Fisher | F16D 65/22 188/196 R |
| 3,269,494 A | * | 8/1966 | Chosy | B60T 1/067 188/206 R |
| 5,284,289 A | | 2/1994 | Killian | |
| 5,339,069 A | * | 8/1994 | Penner | B60T 17/22 116/208 |
| 5,887,687 A | * | 3/1999 | Williams | F16D 51/22 188/330 |

(Continued)

FOREIGN PATENT DOCUMENTS

| CN | 201484405 U | 5/2010 |
|---|---|---|
| CN | 203819227 U | 9/2014 |

OTHER PUBLICATIONS

English Language Abstract for Chinese Publication No. CN201484405U (prepared by European Patent Office Jul. 28, 2015).

(Continued)

*Primary Examiner* — Xuan Lan Nguyen
(74) *Attorney, Agent, or Firm* — Reising Ethington P.C.

(57) ABSTRACT

An improved bracket assembly for receiving a brake assembly and a brake actuator is provided. The bracket assembly includes a tube configured to receive a camshaft of the brake assembly. A brake spider mounting flange is disposed proximate a first end of the tube, defines an aperture configured to allow the tube to extend therethrough, and is configured to receive a brake spider of the brake assembly. An actuator mounting arm is disposed proximate a second end of the tube, is configured for coupling to the brake actuator, and has inboard and outboard members. Each of the inboard and outboard members has a body having a first end affixed to the tube and an actuator mounting flange extending from a second end of the body. The actuator mounting flanges define aligned bores configured to receive a fastener extending from the brake actuator.

24 Claims, 5 Drawing Sheets

(56) References Cited

U.S. PATENT DOCUMENTS

| | | | |
|---|---|---|---|
| 6,341,670 B1 * | 1/2002 | Leblanc | B60T 17/221 |
| | | | 188/1.11 E |
| 6,360,859 B1 * | 3/2002 | Angerfors | B60T 1/067 |
| | | | 188/329 |
| 7,025,181 B2 | 4/2006 | Affeldt et al. | |
| 7,055,662 B1 * | 6/2006 | Jones | F16D 51/22 |
| | | | 188/329 |
| 8,127,903 B2 | 3/2012 | Scheckelhoff et al. | |
| 8,387,926 B2 | 3/2013 | Runels et al. | |
| 2002/0104720 A1 * | 8/2002 | Borugian | F16D 51/20 |
| | | | 188/79.56 |
| 2006/0070826 A1 * | 4/2006 | Thibeault | F16D 65/22 |
| | | | 188/71.1 |
| 2013/0275018 A1 * | 10/2013 | Todd | F16D 66/00 |
| | | | 701/70 |
| 2014/0246280 A1 | 9/2014 | Jones et al. | |

OTHER PUBLICATIONS

English Language Abstract for Chinese Publication No. CN203819227U (prepared by European Patent Office Jul. 28, 2015).

\* cited by examiner

RIGID BRACKET ASSEMBLY FOR MOUNTING A BRAKE ASSEMBLY AND BRAKE ACTUATOR

BACKGROUND OF THE INVENTION a. Field of the Invention

This invention relates to vehicle brakes. In particular, the invention relates to a bracket assembly for mounting a brake assembly and a brake actuator that is better able to withstand mechanical stress within the bracket assembly as compared to conventional bracket assemblies yet is easier to manufacture than conventional bracket assemblies.

b. Background Art

In a conventional drum brake, a brake drum rotates with a wheel or wheels proximate to one end of an axle. The drum defines a radially inner braking surface. A brake spider is disposed about the axle and a pair of brake shoes are pivotally mounted at one end to the brake spider. The opposite end of each brake shoe is engaged by an actuating member such as a cam to move the brake shoes between positions of engagement and disengagement with the braking surface of the brake drum. The cam is driven by a brake actuator acting on one end of a camshaft supporting the cam.

Referring to FIGS. 1-2, in one conventional drum brake, a bracket assembly 10 supports various components of a brake assembly 12 and a brake actuator 14 and positions them relative to one another. The bracket assembly 10 includes a tube 16 through which the camshaft 18 extends and a mounting arm 20 and mounting flange 22 welded to either end of the tube 16 and configured for coupling to the brake actuator 14 and a brake spider 24, respectively. A support 26 is often installed between the vehicle axle 28 and the tube 16 and a gusset 30 is often installed between the tube 16 and arm 20 in order to reduce stress on welds within assembly 10 and to reinforce arm 20.

The above-described design for the bracket assembly 10 has several drawbacks. The mounting arm 20 supporting the brake actuator 14 must be relatively thick to withstand the loads generated by actuation and vibration of the brake actuator 14. The thickness of the arm 20 requires heavy tooling in order to manufacture the arm 20 and prevents formation of intricate features on the arm 20. The gusset 30 used to reinforce the arm 20 provides support to one only end of the arm 20 and requires two additional welds—one weld between one end of the gusset 30 and the tube 16 and another weld between the opposite end of the gusset 30 and the arm 20. Further, even with the addition of the gusset 30, bending and torsional loads cause significant mechanical stress in the welds and significant structural deflection that results in increased air consumption during braking.

The inventor herein has recognized a need for a bracket assembly for mounting a brake assembly and a brake actuator that will minimize and/or eliminate one or more of the above-identified deficiencies.

BRIEF SUMMARY OF THE INVENTION

This invention relates to vehicle brakes. In particular, the invention relates to a bracket assembly for mounting a brake assembly and a brake actuator that is better able to withstand mechanical stress within the bracket assembly as compared to conventional bracket assemblies yet is easier to manufacture than conventional bracket assemblies.

A bracket assembly for receiving a brake assembly and a brake actuator in accordance with one embodiment of the invention includes a tube configured to receive a camshaft of the brake assembly. The bracket assembly further includes a brake spider mounting flange disposed proximate a first end of the tube. The brake spider mounting flange is configured to receive a brake spider of the brake assembly and defines an aperture configured to allow the tube to extend therethrough. The bracket assembly further includes an actuator mounting arm disposed proximate a second end of the tube. The actuator mounting arm is configured for coupling to the brake actuator and has inboard and outboard members. Each of the inboard and outboard members has a body having a first end affixed to the tube and an actuator mounting flange extending from a second end of the body and defining at least one bore configured to receive a fastener extending from the brake actuator. The bore of the actuator mounting flange of the inboard member is aligned with the bore of the actuator mounting flange of the outboard member.

A brake and bracket assembly in accordance with one embodiment of the invention includes a brake assembly, comprising a brake spider, first and second brake shoes having first ends coupled to the brake spider and a camshaft extending through the brake spider and having a cam at a first end configured to engage second ends of the first and second brake shoes. Rotation of the cam causes the first and second brake shoes to move between positions of engagement and disengagement with a braking surface. The brake and bracket assembly further includes a bracket assembly for receiving the brake assembly and a brake actuator. The bracket assembly includes a tube configured to receive a camshaft of the brake assembly and a brake spider mounting flange disposed proximate a first end of the tube. The brake spider mounting flange is configured to receive a brake spider of the brake assembly and defines an aperture configured to allow the tube to extend therethrough. The bracket assembly further includes an actuator mounting arm disposed proximate a second end of the tube. The actuator mounting arm is configured for coupling to the brake actuator and has inboard and outboard members. Each of the inboard and outboard members has a body having a first end affixed to the tube and an actuator mounting flange extending from a second end of the body and defining at least one bore configured to receive a fastener extending from the brake actuator. The bore of the actuator mounting flange of the inboard member is aligned with the bore of the actuator mounting flange of the outboard member.

A method for forming a bracket assembly for receiving a brake assembly and a brake actuator in accordance with one embodiment of the invention includes the step of inserting a tube configured to receive a camshaft of the brake assembly through an aperture in a brake spider mounting flange, the brake spider mounting flange configured to receive a brake spider of the brake assembly. The method further includes the step of fixing an inboard member of an actuator mounting arm configured for coupling to the brake actuator to the tube proximate a first end of the tube. The inboard member has a body having a first end configured for attachment to the tube and an actuator mounting flange extending from a second end of the body, the actuator mounting flange defining at least one bore configured to receive a fastener extending from the brake actuator. The method further includes the step of fixing an outboard member of the actuator mounting arm to the tube proximate the first end of the tube. The outboard member has a body having a first end configured for attachment to the tube and an actuator mounting flange extending from a second end of the body of the outboard member, the actuator mounting flange of the outboard member defining at least one bore configured to receive the fastener and aligned with the at least one bore of the actuator mounting flange of the inboard member following fixing of the inboard and outboard members to the tube.

A bracket assembly for mounting a brake assembly and a brake actuator in accordance with the invention represents an improvement as compared to conventional bracket assemblies. In particular, the configuration of the actuator mounting arm allows the arm to better withstand mechanical stress from the actuator and structural deflection by stiffening both the end of the arm attached to the camshaft tube and the end of the arm configured to receive the brake actuator. As a result, deflection of the arm is reduced and less air is consumed during brake actuation. The configuration of the actuator mounting arm also allows easier manufacture of the bracket assembly. Because the mounting arm is divided into inboard and outboard members, the cost of heavy tooling required for the thick conventional bracket may be avoided. Further, the members may be formed with more intricate features for improved stiffness of the arm. The configuration also allows the gusset found in conventional bracket assemblies to be eliminated and the overall number of welds reduced.

The foregoing and other aspects, features, details, utilities, and advantages of the present invention will be apparent from reading the following description and claims, and from reviewing the accompanying drawings.

DETAILED DESCRIPTION OF THE INVENTION

Figure 3:
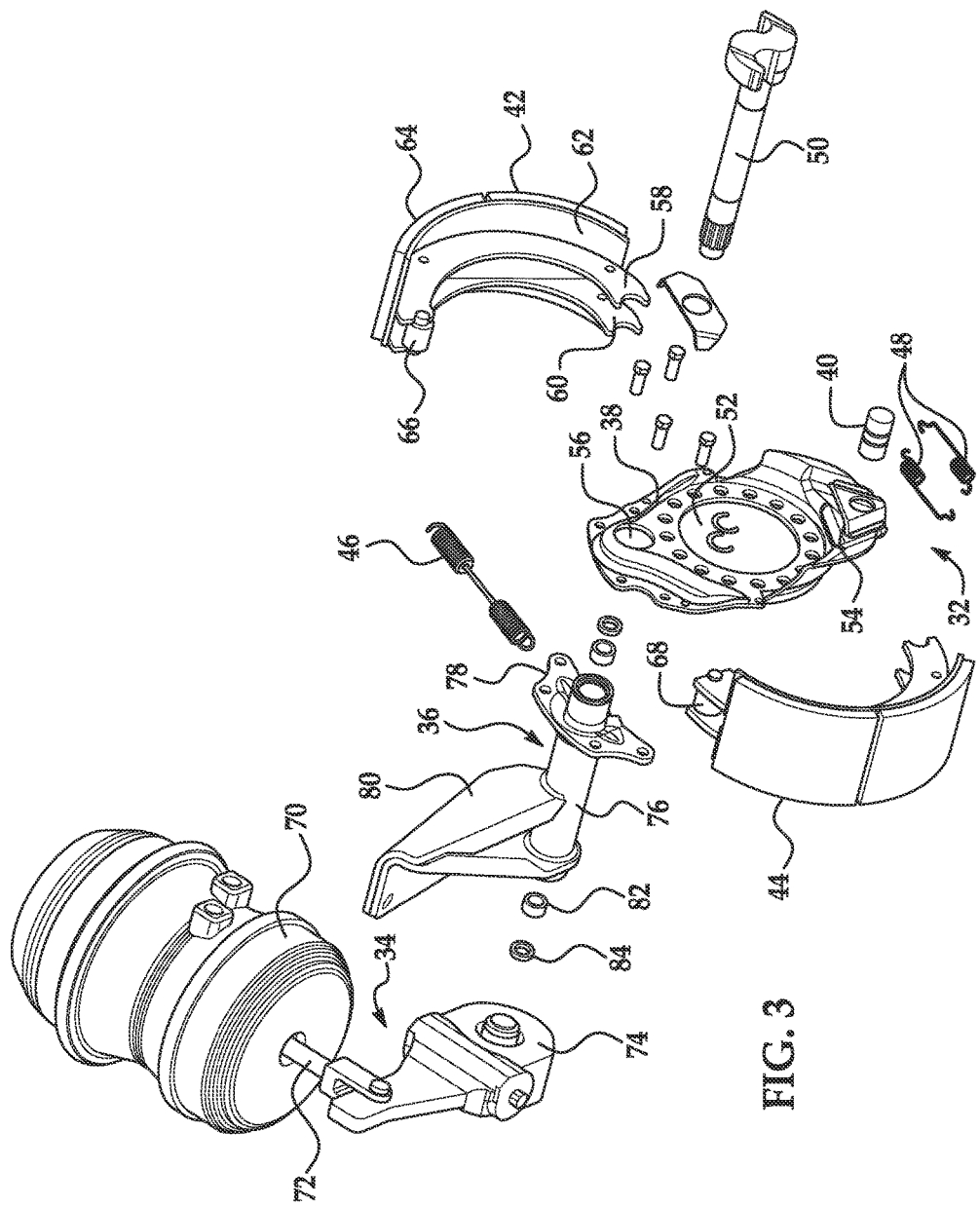
FIG. 3 is an exploded view of a brake assembly, a brake actuator and a bracket assembly for mounting the brake assembly and brake actuator in accordance with one embodiment of the present teachings.

Referring now to the drawings wherein like reference numerals are used to identify identical components in the various views, FIG. 3 illustrates a brake 32, a brake actuating means 34 and a bracket assembly 36 for mounting the brake 32 and brake actuating means 34 in accordance with one embodiment of the present invention.

Brake 32 is provided to halt rotation of one or more vehicle wheels. Brake 32 is particularly adapted for use in heavy vehicles. It should be understood, however, that brake 32 may be used on a wide variety of vehicles and in non-vehicular applications. Brake 32 is configured to act against an annular brake drum (not shown) that rotates with the vehicle wheel or wheels at one end of an axle (not shown). Brake 32 may include a brake spider 38, an anchor pin 40, brake shoes 42, 44, return and retaining springs 46, 48, and a camshaft 50.

Spider 38 is provided to mount the various components of brake 32. Spider 38 defines a central aperture 52 through which the vehicle axle may extend. Spider 38 may further define bores 54, 56, on either side of aperture 52 configured to receive anchor pin 40 and camshaft 50.

Anchor pin 40 is provided to pivotally mount brake shoes 42, 44 to brake spider 38. Anchor pin 40 may comprise a round pin and may be received within bore 54 of spider 38. Although only one anchor pin 40 is shown in the illustrated embodiment, it should be understood that brakes shoes 42, 44 may be pivotally mounted to two separate anchor pins 40.

Brake shoes 42, 44 are provided for selective engagement with a braking surface of a drum (not shown) in order to apply a braking torque to the drum and one or more vehicle wheels. Each brake shoe 42, 44 may include a pair of spaced webs 58, 60, a brake table 62, and one or more brake linings 64. Webs 58, 60 support brake table 62 and may extend generally parallel to one another. Webs 58, 60 may be made from metals and metal alloys such as steel. Webs 58, 60 are arcuate in shape and extend between opposite ends of brake shoes 42, 44. Webs 58, 60 may be secured to brake table 62 using welds or other conventional fastening means. Each web 58, 60 may define semicircular recesses at either end configured to receive pin 40 and a corresponding one of cam followers 66, 68. Webs 58, 60 may also provide a connection point for return spring 46 and retaining springs 48. Brake table 62 is provided to support brake linings 64. Table 62 may be made from conventional metals and metal alloys including steel and may be arcuate in shape. Brake linings 64 are provided for frictional engagement with the braking surface of the drum. Linings 64 may be made from conventional friction materials. Brake linings 64 may be secured to brake table 62 using a plurality of rivets or other conventional fasteners.

Return spring 46 is provided to bias brake shoes 42, 44 to a position of disengagement from the braking surface. Retainer springs 48 are provided to retain brake shoes 42, 44—and particularly webs 58, 60—on anchor pin 40. Springs 46, 48 are conventional in the art. The ends of springs 46, 48 extend through corresponding apertures in webs 58, 60 of brake shoes 42, 44.

Camshaft 50 is provided to cause movement of brake shoes 42, 44 between positions of engagement with and disengagement from the braking surface of the drum. In the illustrated embodiment, camshaft 50 includes a conventional doubled lobed S-cam actuator. Cam followers 66, 68 follow the surface of the cam as it rotates thereby causing shoes 42, 44 to pivot about an axis defined by anchor pin 40. The opposite end of camshaft 50 is configured for coupling to brake actuating means 34.

Brake actuating means 34 is provided to cause rotation of camshaft 50 in order to apply or release brake 32. Actuating means 34 is conventional in the art and may include a brake actuator 70 having a pushrod 72 extending from a fluid chamber. Pushrod 72 is configured to engage a conventional slack adjuster 74 coupled to one end of camshaft 50. Fluid flow within the chamber of actuator 70 is controlled to cause linear movement of pushrod 72 which is translated into rotational movement of camshaft 50 by slack adjuster 74 to apply and release brake 32.

Bracket assembly 36 is provided to mount brake 32 and brake actuator 70 and position brake 32 and actuator 70 relative to one another. Assembly 36 includes a camshaft tube 76, a brake spider mounting flange 78 and an actuator mounting arm 80.

Tube 76 houses camshaft 50 and protects camshaft 50 from external objects and elements. Tube 76 is cylindrical in shape and is configured to receive bushings 82 in each longitudinal end that are disposed about camshaft 50 and permit rotation of camshaft 50 relative to tube 76. Tube 76 is also configured to receive grease seals 84 in each longitudinal end to prevent loss of lubricating grease from within tube 76.

Brake spider mounting flange 78 is provided to receive brake spider 38. Flange 78 may comprise a unitary structure formed from a metal blank through a drawing process or by casting, forging or three-dimensional printing. In the illustrated embodiment, flange 78 is substantially trapezoidal in shape. It should be understood, however, that the configuration of flange 78 may vary depending on the configuration of spider 38. Flange 78 and spider 38 may be attached using various fasteners including bolts, rivets and welds. Flange 78 defines a central aperture that may be centered on the axis of rotation of camshaft 50. The aperture is configured to receive an outboard end of tube 76 and to allow tube 76 and camshaft 50 to extend therethrough. Further information regarding one potential embodiment of flange 78 is described in pending U.S. patent application Ser. No. 14/327,179, the entire disclosure of which is incorporated herein by reference.

Figure 1:
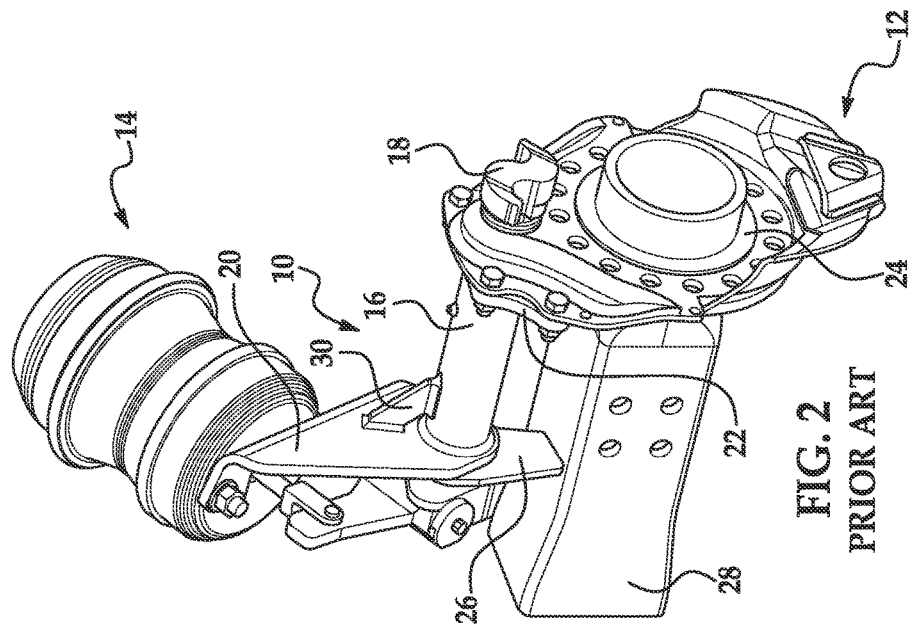
FIGS. 1-2 are perspective views of a prior art bracket assembly for mounting a brake assembly and a brake actuator.
Figure 2:
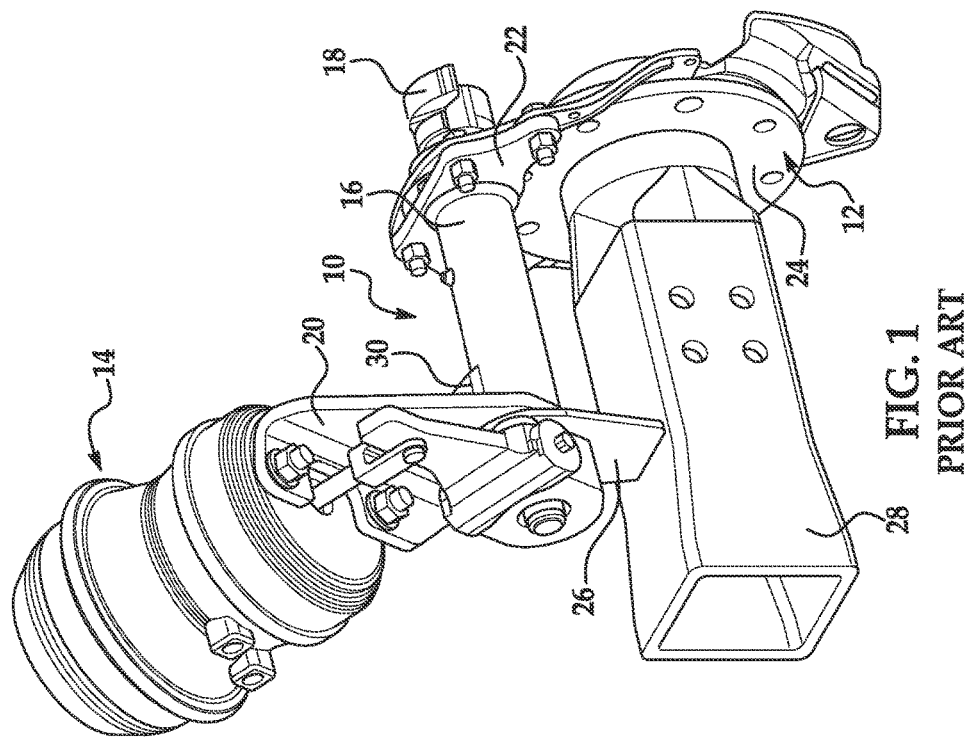

Actuator mounting arm 80 is provided for mounting brake actuator 70. Arm 80 is disposed proximate an inboard end of tube 76 and is configured for coupling to actuator 70. Referring to FIGS. 4-7, arm 80 includes inboard and outboard members 86, 88. The total thickness of members 86, 88 may be less than the thickness of a conventional mounting bracket 20. As a result, arm 80 may use the same or less material as the conventional bracket 20 shown in FIGS. 1-2.

Figure 4:
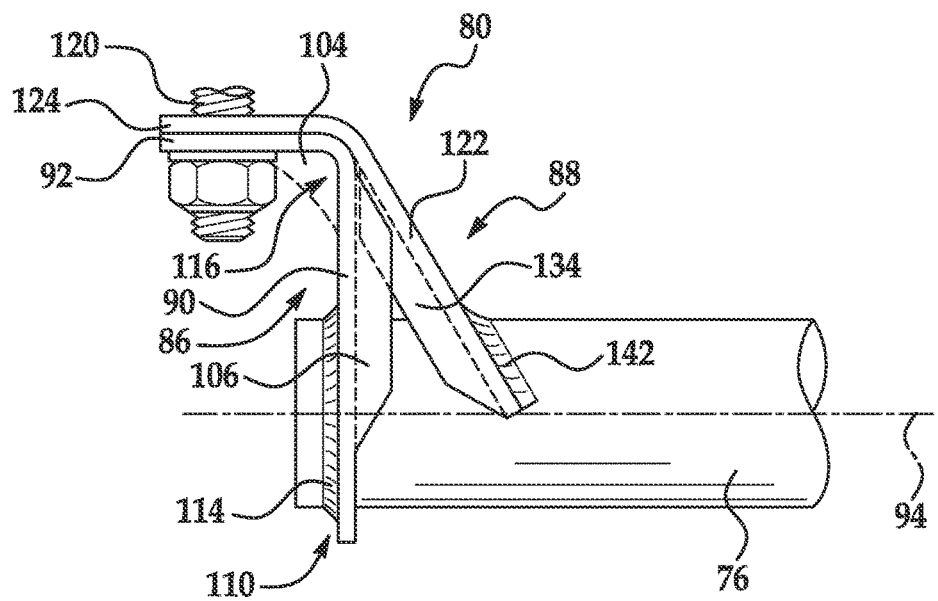
FIG. 4 is a plan view of a bracket assembly in accordance with one embodiment of the present teachings.
Figure 5:
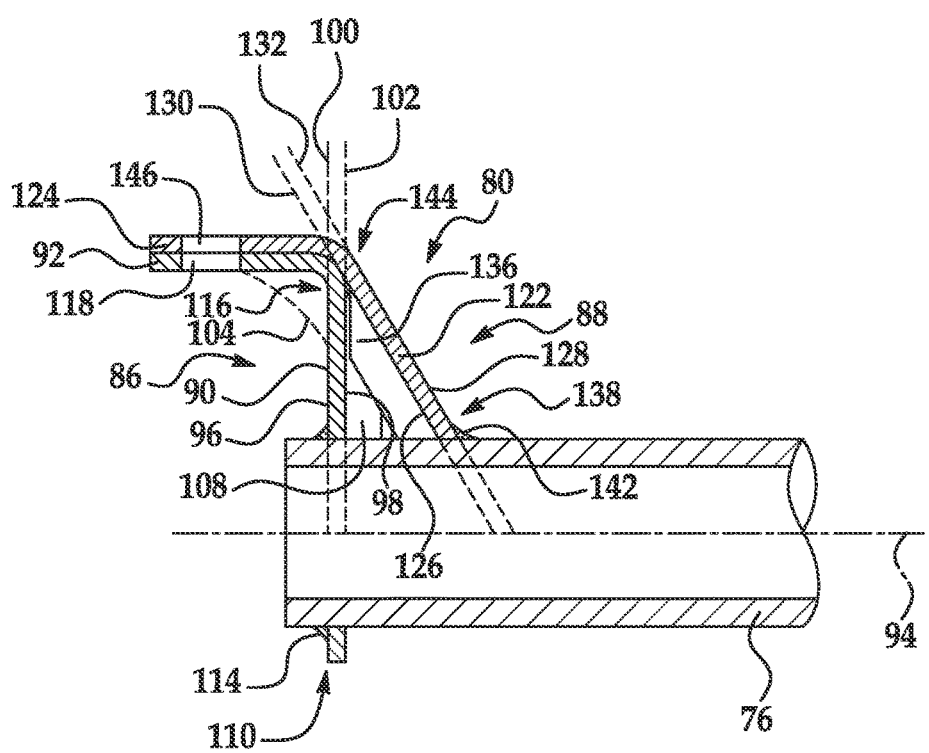
FIG. 5 is a cross-sectional view of the bracket assembly of FIG. 4.
Figure 6:
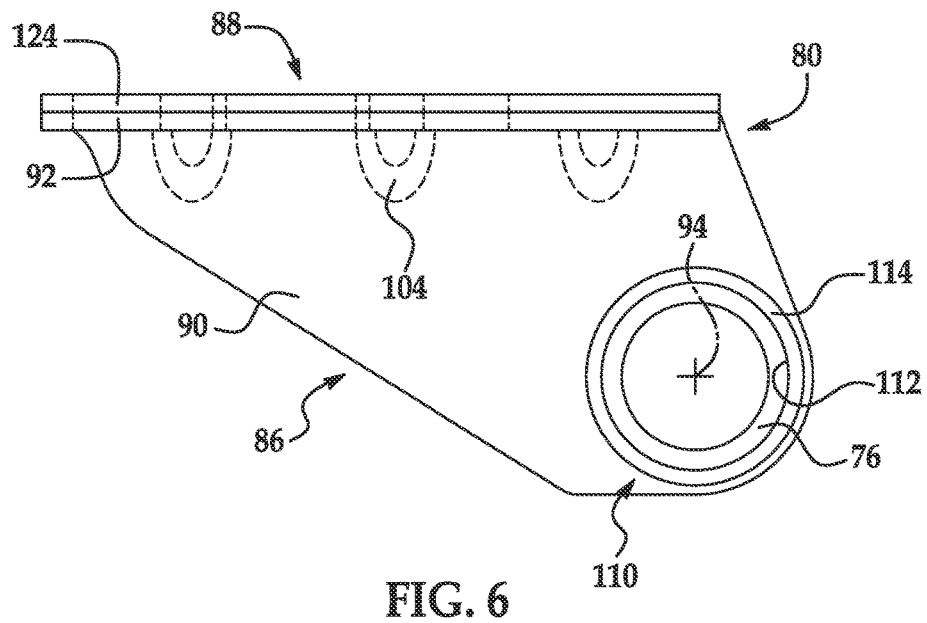
FIG. 6 is an top view of the bracket assembly of FIGS. 4-5.

Inboard member 86 includes a body 90 and a mounting flange 92. Referring to FIG. 6, body 90 is generally triangular in cross-section when viewed in the direction of a longitudinal axis 94 of tube 76. It should be understood, however, that the shape of body 90 may vary. Referring to FIG. 5, body 90 defines inboard and outboard surfaces 96, 98 that are disposed in planes 100, 102 that may be perpendicular to axis 94 of tube 76. Gussets 104 may be formed in, or added to, member 86 and extend between inboard surface 96 of body 90 and flange 92 (at an elbow formed where body 90 and flange 92 meet) to provide additional strength and ridigity to member 86. Referring to FIGS. 4-5, stiffening flanges 106, 108 may also extend from either side of body 90 in an outboard direction and towards member 88 of arm 80. One end 110 of body 90 is affixed to tube 76. In particular, and with reference to FIG. 6, body 90 defines a bore 112 configured to receive tube 76. A weld 114 may be made on an inboard side of body 90 and may be applied to an entire circumference of tube 76 and to a circumferential portion of surface 96 of body 90 surrounding bore 112 to affix member 86 to tube 76. Referring again to FIGS. 4-5, flange 92 extends from an opposite end 116 of body 90 and may extend from body 90 in an inboard direction generally parallel to axis 94 of tube 76. Flange 92 defines one or more bores 118 (FIG. 5) configured to receive fasteners 120 (FIG. 4) extending from brake actuator 70 and used to couple the fluid chamber of brake actuator 70 to arm 80. Flange 92 may further define a notch (not shown) through which pushrod 72 of actuator 70 may extend to engage slack adjuster 74.

Figure 7:
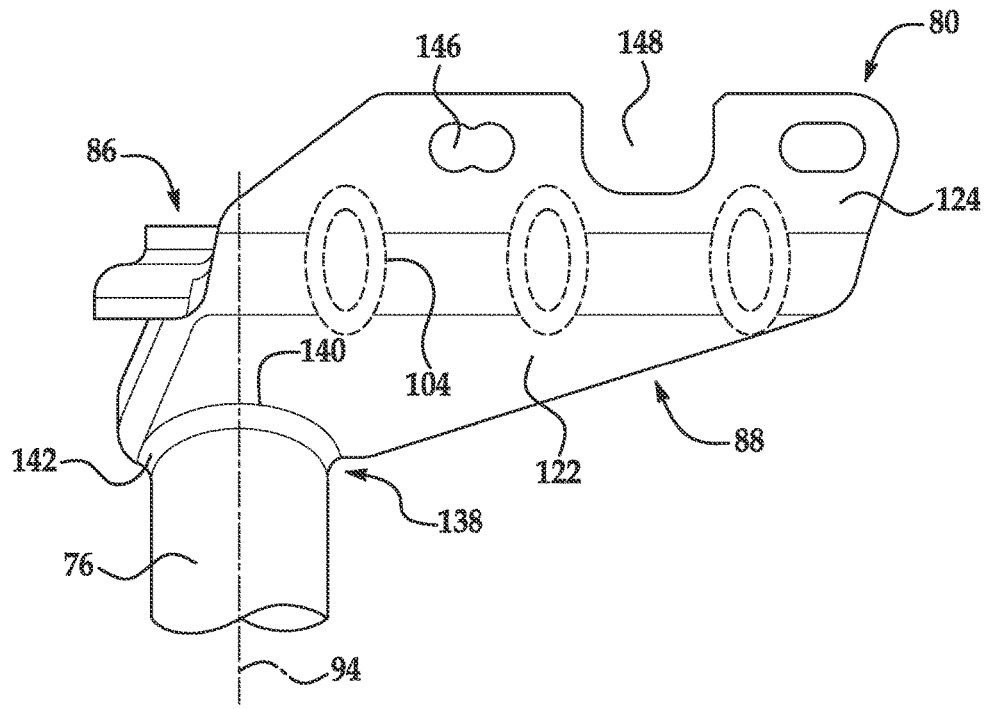
FIG. 7 is an end view of the bracket assembly of FIGS. 4-6.

Outboard member 88 also includes a body 122 and a mounting flange 124. Referring to FIG. 7, body 122 is generally triangular in cross-section when viewed in the direction of a longitudinal axis 94 of tube 76. It should be understood, however, that the shape of body 122 may vary. Referring to FIG. 5, body 122 defines inboard and outboard surfaces 126, 128 that are disposed in planes 130, 132 that form acute angles with longitudinal axis 94 of tube 76. As a result, a distance between body 90 of member 86 and body 122 of member 88 continuously decreases moving from the ends of bodies 90, 122 affixed to tube 76 to the opposite ends of bodies 90, 122 from which flanges 92, 124 extend. Because of the relative orientation of bodies 90, 122, a generally tetrahedral structure is formed with tube 76 that is strong and rigid in bending and torsion. Referring to FIGS. 4-5, stiffening flanges 134, 136 may extend from either side of body 122 in an inboard direction and towards member 86 of arm 80. Flanges 134, 136 may overlap flanges 106, 108 (with flanges 134, 136 disposed between flanges 106, 108 in the illustrated embodiment) such that portions of the flanges 106, 108, 134, 136 are disposed in a common plane extending perpendicular to axis 94 of tube 76. Referring to FIG. 5, one end 138 of body 122 is affixed to tube 76. In particular, and with reference to FIG. 7, body 122 may define an arcuate recess 140 configured to receive tube 76. A weld 142 may be made on an outboard side of body 122 and may be applied to a portion of the circumference of tube 76 (less than the entire circumference of tube 76) and to a corresponding portion of surface 128 of body 124 surrounding recess 140 to affix member 88 to tube 76. Referring again to FIG. 5, flange 124 extends from an opposite end 144 of body 122 and may extend from body 122 in a inboard direction generally parallel to axis 94 of tube 76. Flange 124 is adjacent to, and may contact, flange 92 of inboard member 86. After being joined by fasteners 120, the contacting surfaces of flanges 92, 124 provide frictional resistance to relative displacement of the flanges 92, 124 and members 86, 88 of arm 80 may not include any welds directly joining members 86, 88. Alternatively, welds may be used to couple and align members 86, 88 prior to or after welding members 86, 86 to tube 76. Flange 124 overlays flange 92 such that flange 92 is nearer to tube 76 than flange 124. Flange 124 defines one or more bores 146 (FIG. 5) configured to receive fasteners 120 (FIG. 4) extending from brake actuator 70 and used to couple the fluid chamber of brake actuator 70 to arm 80. Bores 146 are aligned with bores 118 in flange 92 of member 86. Referring to FIG. 7, flange 124 may further define a notch 148 between bores 146 (and aligned with a corresponding notch in flange 92) through which pushrod 72 of actuator 70 may extend to engage slack adjuster 74.

Figure 8:
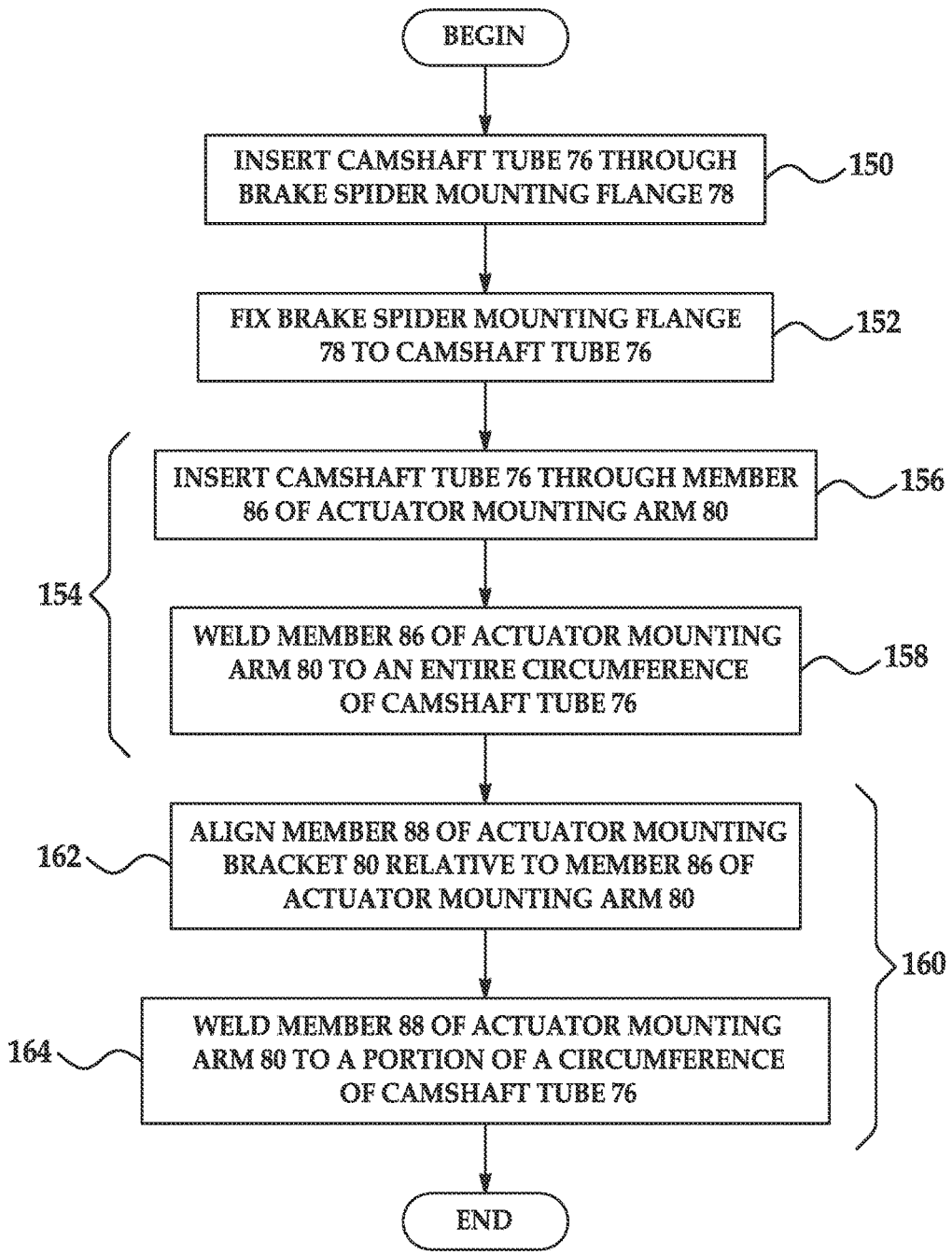
FIG. 8 is a flowchart illustrating a method for forming a bracket assembly for mounting a brake assembly and a brake actuator in accordance with one embodiment of the present teachings.

Referring now to FIG. 8, a method for forming a bracket assembly 36 for mounting a brake assembly 32 and a brake actuator 70 will be described. The method may begin with the steps 150, 152 of inserting tube 76 through an aperture in the brake spider mounting flange 78 and fixing flange 78 to the tube 76 proximate one end of the tube 76. As noted above using flange 78 may be affixed to tube 76 using various fasteners including bolts, rivets and welds. The method may continue with the step 154 of fixing inboard member 86 of actuator mounting arm 80 to tube 76 proximate another end of tube 76. Step 154 may include the substeps 156, 158 of inserting tube 76 through bore 112 in body 90 of member 86 and welding end 114 of body 90 to an entire circumference of tube 76. Although steps 154 is illustrated in FIG. 8 as occurring after steps 150, 152, it should be understood that step 154 could occur prior to steps 150, 152. The method may continue with the step 160 of fixing outboard member 88 to tube 76 proximate the end of tube 76 to which member 86 is affixed. Step 160 may include the substep 162 of aligning member 88 relative to member 86 such that the bores 118, 146 in members 86, 88, respectively, are aligned with one another. Step 158 may further include the substep 164 of welding end 138 of body 122 to a portion of a circumference of tube 76.

A bracket assembly 36 for mounting a brake 32 and a brake actuator 70 in accordance with the present invention represents an improvement relative to conventional bracket assemblies. The configuration of the actuator mounting arm 80, including for example the roughly tetrahedral structure formed by members 86, 88 with tube 76, allows the arm 80 to better withstand mechanical stress from the actuator 70 and structural deflection by stiffening both the end of the arm 80 attached to the camshaft tube 76 and the end of the arm 80 configured to receive the brake actuator 70. As a result, deflection of the arm 80 and is reduced and less air is consumed during brake actuation. The configuration of the actuator mounting arm 80 also allows easier manufacture of the bracket assembly 36. Because the mounting arm 80 is divided into inboard and outboard members 86, 88, the cost of heavy tooling required for the relatively thick conventional bracket may be avoided. Further, the members 86. 88 may be formed with more intricate features for improved stiffness of the arm 80. The configuration also allows the gusset found in conventional bracket assemblies to be eliminated and the overall number of welds reduced. In particular, as compared to three welds used to secure a conventional actuator mounting bracket to the camshaft tube and the gusset to both the bracket and tube, the actuator mounting bracket 76 disclosed herein requires only two welds 114, 142. Because the gusset 30 used with a conventional bracket 20 is eliminated arm 80 also does not increase the number of stampings required despite the use of multiple members 86, 86 to form arm 80.

While the invention has been shown and described with reference to one or more particular embodiments thereof, it will be understood by those of skill in the art that various changes and modifications can be made without departing from the spirit and scope of the invention.

What is claimed is:

1. A bracket assembly for receiving a brake assembly and a brake actuator, comprising:
    a tube configured to receive a camshaft of the brake assembly;
    a brake spider mounting flange disposed proximate a first end of said tube, said brake spider mounting flange configured to receive a brake spider of the brake assembly and defining an aperture configured to allow said tube to extend therethrough; and,
    an actuator mounting arm disposed proximate a second end of said tube, said actuator mounting arm configured for coupling to said brake actuator and having inboard and outboard members, each of said inboard and outboard members having
        a body having a first end affixed to the tube; and
        an actuator mounting flange extending from a second end of the body and defining at least one bore configured to receive a fastener extending from said brake actuator
        wherein said bore of said actuator mounting flange of said inboard member is aligned with said bore of said actuator mounting flange of said outboard member.

2. The bracket assembly of claim 1 wherein a distance between said bodies of said inboard and outboard members continuously decreases moving from said first ends of said bodies to said second ends of said bodies.

3. The bracket assembly of claim 1 wherein an inboard side of said body of said inboard member is disposed in a plane that is perpendicular to a longitudinal axis of the tube and an inboard side of said body of said outboard member is disposed in a plane that forms an acute angle with the axis.

4. The bracket assembly of claim 1 wherein the inboard and outboard members are not welded to one another.

5. The bracket assembly of claim 1 wherein said first end of said body of said inboard member is welded to an entire circumference of said tube and said first end of said body of said outboard member is welded to only a portion of said circumference of said tube.

6. The bracket assembly of claim 1 wherein said inboard member has a stiffening flange extending in an outboard direction and said outboard member has a stiffening flange extending in an inboard direction.

7. The bracket assembly of claim 6 wherein portions of said stiffening flanges of said inboard member and said outboard member are disposed in a common plane extending perpendicular to a longitudinal axis of the tube.

8. The bracket assembly of claim 1 wherein said actuator mounting flange of said inboard member is nearer to said tube than said actuator mounting flange of said outboard member.

9. A brake and bracket assembly, comprising:
    a brake assembly, comprising:
        a brake spider;
        first and second brake shoes having first ends coupled to said brake spider; and,
        a camshaft extending through said brake spider and having a cam at a first end configured to engage second ends of said first and second brake shoes, rotation of said cam causing said first and second brake shoes to move between positions of engagement and disengagement with a braking surface; and,
    a bracket assembly for receiving said brake assembly and a brake actuator, comprising:
        a tube configured to receive said camshaft of the brake assembly;
        a brake spider mounting flange disposed proximate a first end of said tube, said brake spider mounting flange configured to receive said brake spider of the brake assembly and defining an aperture configured to allow said tube to extend therethrough; and,
        an actuator mounting arm disposed proximate a second end of said tube, said actuator mounting arm configured for coupling to said brake actuator and having inboard and outboard members, each of said inboard and outboard members having
            a body having a first end affixed to the tube; and
            an actuator mounting flange extending from a second end of the body and defining at least one bore configured to receive a fastener extending from said brake actuator
            wherein said bore of said actuator mounting flange of said inboard member is aligned with said bore of said actuator mounting flange of said outboard member.

10. The brake and bracket assembly of claim 9 wherein a distance between said bodies of said inboard and outboard members continuously decreases moving from said first ends of said bodies to said second ends of said bodies.

11. The brake and bracket assembly of claim 9 wherein an inboard side of said body of said inboard member is disposed in a plane that is perpendicular to a longitudinal axis of the tube and an inboard side of said body of said outboard member is disposed in a plane that forms an acute angle with the axis.

12. The brake and bracket assembly of claim 9 wherein the inboard and outboard members are not welded to one another.

13. The brake and bracket assembly of claim 9 wherein said first end of said body of said inboard member is welded to an entire circumference of said tube and said first end of said body of said outboard member is welded to only a portion of said circumference of said tube.

14. The brake and bracket assembly of claim 9 wherein said inboard member has a stiffening flange extending in an outboard direction and said outboard member has a stiffening flange extending in an inboard direction.

15. The brake and bracket assembly of claim 14 wherein portions of said stiffening flanges of said inboard member and said outboard member are disposed in a common plane extending perpendicular to a longitudinal axis of the tube.

16. The brake and bracket assembly of claim 9 wherein said actuator mounting flange of said inboard member is nearer to said tube than said actuator mounting flange of said outboard member.

17. A method for forming a bracket assembly for mounting a brake assembly and a brake actuator, comprising the steps of:
inserting a tube configured to receive a camshaft of the brake assembly through an aperture in a brake spider mounting flange, said brake spider mounting flange configured to receive a brake spider of the brake assembly;
fixing an inboard member of an actuator mounting arm configured for coupling to said brake actuator to said tube proximate a first end of said tube, the inboard member having a body having a first end configured for attachment to said tube and an actuator mounting flange extending from a second end of said body, said actuator mounting flange defining at least one bore configured to receive a fastener extending from said brake actuator; and,
fixing an outboard member of said actuator mounting arm to said tube proximate said first end of said tube, said outboard member having a body having a first end configured for attachment to said tube and an actuator mounting flange extending from a second end of said body of said outboard member, said actuator mounting flange of said outboard member defining at least one bore configured to receive said fastener and aligned with said at least one bore of said actuator mounting flange of said inboard member following fixing of said inboard and outboard members to said tube.

18. The method of claim 17 further comprising the step of fixing said brake spider mounting flange to said tube proximate a second end of said tube.

19. The method of claim 17 wherein said fixing of said inboard member includes welding said first end of said body of said inboard member to an entire circumference of said tube.

20. The method of claim 17 wherein said fixing of said outboard member includes aligning said outboard member relative to said inboard member, after said inboard member is fixed to said tube, such that said bores of said actuator mounting flanges of said inboard and outboard members are aligned.

21. The method of claim 20 wherein said fixing of said outboard member further includes welding said first end of said body of said outboard member to only a portion of a circumference of said tube.

22. The method of claim 17 wherein a distance between said bodies of said inboard and outboard members continuously decreases moving from said first ends of said bodies to said second ends of said bodies after fixing said inboard and outboard members to said tube.

23. The method of claim 17 wherein an inboard side of said body of said inboard member is disposed in a plane that is perpendicular to a longitudinal axis of the tube and an inboard side of said body of said outboard member is disposed in a plane that forms an acute angle with the axis after fixing said inboard and outboard members to said tube.

24. The method of claim 17 wherein the inboard and outboard members are not welded to one another.

\* \* \* \* \*